Patented June 5, 1928.

1,672,688

UNITED STATES PATENT OFFICE.

JEAN POMMÉE, OF WILHELMSBURG-ON-THE-ELBE, GERMANY.

FILLING FOR DISSOLVED GAS AND METHOD OF PRODUCING SAME.

No Drawing. Application filed May 8, 1925, Serial No. 28,982, and in Germany May 5, 1924.

The filling of storage and transportation vessels for storing explosive gases, which have been dissolved in liquids, for instance solutions of acetylene in acetone, with infusorial earth or granular pumice, is well known. Such fillings have however proved unsuitable for transport on the railway, as these fillings are liable to be crushed by the shaking which takes place on account of the rail-joints and on account of the vibration which they have to undergo. The filling mass shakes together and cavities are formed which easily cause explosions.

I have found that these drawbacks can be overcome, by giving minerals, capable of absorbing fluids, such as infusorial earth or pumice, a preliminary treatment, by virtue of which their internal capacity of resistance is increased, thus preventing a subsequent change of form, even when subjected to long continued jolting whereas the capacity for absorbing fluids is not decreased or may even be increased. These materials are hereinafter embraced in the expression "a highly porous mineral of a siliceous nature".

The preliminary treatment consists in heating the minerals in question until fritting is accomplished. The most favourable temperature for fritting has proved to be 900° C. The mass which has been fritted is ground in a suitable breaking device, for instance in a crushing-mill, and finally passed through a sieve. The best size of grain is between 2 and 3½ mm.

As cavities form between the individual grains of the granulated pumice, as well as between those of the infusorial earth, which, although very small, are sufficiently large to permit the formation of free gas, it has further proved of advantage to mix the granulated material with say 25% of a finely pulverized neutral substance, for instance pumice powder, silica (infusorial earth) powder, silica gel, etc. The granulated mass (sintered as above described) is uniformly mixed with the powder and packed tightly into the storage- and transportation-vessels.

Explosions of the contents of vessels, which are filled with such a mass, consisting of fritted and granulated pumice or infusorial earth and embedded in one of the powders described, become practically impossible.

I claim:—

1. A filling for storage- and transportation-vessels for storing an explosive gas dissolved in a liquid, suitable for storing acetylene dissolved in acetone, consisting of fritted and granulated pumice gravel, in a pressure-tight container suitable for shipping such dissolved gas under pressure.

2. A process for producing a filling material for storage- and transportation-vessels for storing an explosive gas dissolved in a liquid, comprising the step of fritting porous minerals of a highly siliceous character, granulating the fritted mass, mixing the same with pulverulent porous material of highly siliceous nature.

3. A process for producing a filling for storage- and transportation-vessels for storing the explosive gas dissolved in a liquid, which comprises the steps of fritting a porous mineral of a highly siliceous nature and crushing the same until a large part thereof is reduced to a size of about 2 to 3½ mm.

4. A process of producing a filling for storage- and transportation-vessels for storing an explosive gas dissolved in a liquid, suitable for storing dissolved acetylene under pressure, which comprises fritting and granulating the mineral and uniformly mixing same with a substance containing silicic acid and tamping the mixture into a pressure-tight storage- and transportation-vessel suitable for storing dissolved acetylene.

5. A process for producing a filling material for storage- and transportation-vessels for storing explosive gases dissolved in fluids, comprising the step of fritting porous material of a highly siliceous character at a temperature of about 900° C., and thereafter crushing the material, separating the crushed material into a granular portion and a pulverulent portion and intimately mixing the granular portion with a pulverulent highly siliceous porous material.

In testimony whereof I affix my signature.

JEAN POMMÉE.